Jan. 31, 1933.                J. C. McCUNE                1,895,481
                          FLUID PRESSURE BRAKE
                          Filed Feb. 19, 1932
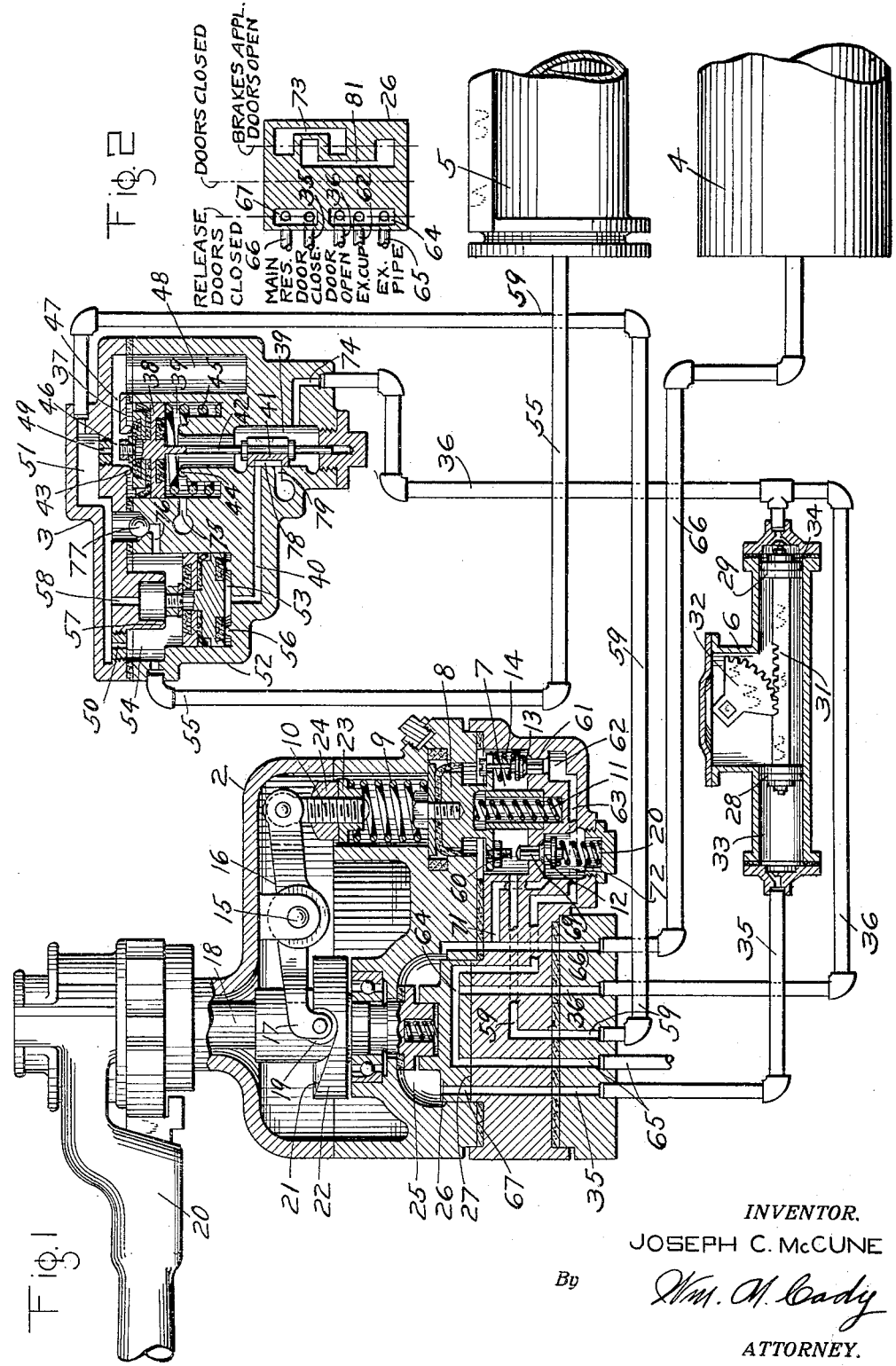
INVENTOR.
JOSEPH C. McCUNE
By  Wm. M. Cady
                    ATTORNEY.

Patented Jan. 31, 1933

1,895,481

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 19, 1932. Serial No. 593,959.

This invention relates to improvements in fluid pressure brakes and more particularly to means for controlling the application and release of the brakes and also the opening and closing of the car doors.

In my copending application for patent, now allowed, Serial No. 463,387, filed June 24, 1930, a fluid pressure brake system is disclosed wherein a door engine is supplied with operating fluid controlled by the brake valve, and wherein the brake cylinder pressure continues to build up after the car has come to rest and so long as the brake valve remains in door open position.

It is an object of this invention to provide a fluid brake system having a brake valve similar in construction to that disclosed in the above noted application, and wherein the fluid supplied to the door engine is so controlled that when the brake valve is moved to brakes applied door open position, the doors are caused to open a predetermined time after the brakes are applied, so that the car may be brought to rest before the doors are opened.

A further object of the invention is to provide a fluid brake system having the above noted characteristics wherein, during an application of the brakes and while the brake valve is in brake applied door open position, the brake cylinders are supplied with fluid at a predetermined rate for a predetermined time, and then supplied with fluid at a slower rate to compensate for possible leakage and to bring the car to rest and maintain the brakes applied, thereby preventing, shocks incident to supplying fluid to the brake cylinders at a fast rate until the car is brought to rest, and the waste of fluid under pressure and reducing the time required for releasing the brakes.

A further object of the invention is to provide a fluid brake system wherein a timing valve is employed in combination with a brake valve and a door engine for controlling the rate of fluid delivery to the brake cylinder and for determining the time of initial operation of the door engine after the brake valve is moved to brake application position.

These and other objects that will be made apparent throughout the further description of the invention are attained by means of the fluid pressure brake equipment hereinafter described and illustrated in the accompanying drawing, wherein Fig. 1 is diagrammatic sectional view of a fluid pressure brake equipment embodying features of the invention, showing the parts in release position; and Fig. 2 is a development view showing the connections made between the rotary valve of the brake valve device and its seat in the several positions of the brake valve handle.

Referring to the drawing, the equipment may comprise a brake valve device 2, a timing valve device 3, a main reservoir 4, a brake cylinder 5 and a door engine 6.

The brake valve device 2 may comprise a casing having a piston chamber 7 containing a piston 8, subject on one side to the pressure of a heavy coil spring 9 and subject on the opposite side to the pressure of a light coil spring 11, and to fluid under pressure supplied to chamber 7 during the operation of the device, as will be hereinafter more fully described.

Contained in the casing and disposed beneath the piston 8 is a fluid pressure supply valve 12 and an exhaust or release valve 13 having a lost motion connection to the piston 8. A spring 14 yieldingly positions the valve with respect to the piston, and when the piston is in the normal release position, as shown, the valve is held off its seat. The supply valve 12 is normally held seated by a spring 20 and is adapted to be unseated by the downward movement of the piston 8.

Pivotally mounted on a pivot pin 15 within the casing of the brake valve device 2 is a lever 16, having an arm at one side of the pin which terminates in a yoke 17 having prongs which straddle the main shaft 18 of the brake valve device, and which carries rollers 19 that engage two diametrically opposite cam faces 21 (one of which is shown) of the cam 22 that is secured to the main shaft 18.

The arm of the lever 16 on the opposite side of the pivot pin 15 is pivotally connected to a threaded stem 10, upon which an adjustable sleeve 23 is locked by a threaded nut 24. The sleeve engages the spring 9, which provides a yielding operating connection between the lever 16 and the piston 8.

The main shaft 18 is journaled for rotation in the casing and is provided exteriorly with a removable operating handle 20. The lower end of the shaft 18 extends into a distributing chamber 25 and is splined to a rotary slide valve 26 that engages a valve seat 27 in the casing.

The door opening engine 6 may comprise two pistons 28 and 29, which are connected by a stem constituting a gear rack 31 with which a gear segment 32 is operatively meshed, the segment serving to operate a car door (not shown). The pistons 28 and 29 operate within cylinders 33 and 34 respectively, and are actuated by fluid under pressure supplied to the cylinders through the door closing pipe and passage 35 and the door opening pipe and passage 36 respectively, both passages leading to the slide valve seat 27 of the brake valve device.

The timing valve device 3 may comprise a casing having a piston chamber 37 and containing a valve piston 38 and a valve chamber 39 communicating with the door open pipe 36 and containing a slide valve 41 connected to the piston stem 42 and adapted to be operated by the valve piston 38, which moves between and makes sealing engagement with valve seat ribs 43 and 44 in the chambers 37 and 39 respectively. A spring 45 in the valve chamber 39 normally biases the piston into sealing engagement with the seat rib 43 and closes communication between the piston chamber 37 and a chamber 46, which is connected through passage 47 with a timing reservoir 48, and through a choke passage 49 with the passage 51, which communicates with pipe 59 leading to the brake valve device 2.

The casing also contains a fluid actuated valve piston 52, having on one side a chamber 53 that is connected to passage 40 leading to the seat of slide valve 41, and on the other side a chamber 54 that is connected to the brake cylinder 5 by a pipe and passage 55, and to passage 51 through a choke passage 50. The valve piston 52 moves between, and makes sealing engagement with, the seat ribs 56 and 57 contained in the chambers 53 and 54 respectively.

With the brake valve and parts of the equipment in the "release doors closed position" shown, the brake cylinder 5 is open to the atmosphere through pipe and passage 55, chamber 54, past the open valve piston 52, passage 58, passage 51, pipe and passage 59, piston chamber 7 in the brake valve device 2, past the exhaust valve 13, through passage 61, exhaust chamber 62, passage 63, cavity 64 in the rotary slide valve 26 and exhaust passage and pipe 65.

Fluid under pressure is supplied from the main reservoir to the door engine cylinder 33 for holding the doors closed through pipe and passage 66, rotary valve chamber 25, port 67 in the rotary slide valve 26, and passage and pipe 35. The cylinder 34 of the door engine is open to the atmosphere through pipe and passage 36, cavity 64 and exhaust passage and pipe 65. The car door, not shown, is therefore retained in closed position, when the brake valve is in release door closed position.

In order to apply the brakes, the brake valve handle 20 is operated to rotate the main shaft 18 in a counter-clockwise direction, thus causing the inclined cams 21 to be moved under the rollers 19, thereby lifting the yoke 17 and pressing the right end of the lever 16 downward, thus compressing the spring 9 and moving the piston 8 downward against the pressure of the spring 11.

The downward movement of the piston 8 first operates to cause the exhaust valve 13 to move to its seat, so as to cut off communication from chamber 7 to the atmosphere and then further downward movement causes a threaded adjustable stud 60, carried by the piston 8, to engage and move the supply valve 12 from its seat, thereby opening communication between the main reservoir 4 and the brake cylinder through pipe and passage 66, passage 71, supply valve chamber 72, past the supply valve 12 into chamber 7, passage and pipe 59, passage 51, passage 58, chamber 54 and passage and pipe 55.

When the fluid pressure within the brake cylinder 5 and the chamber 7 of the brake valve device builds up sufficiently to overcome the pressure of the spring 9 on the upper side of the piston 8, the piston will move upwardly sufficiently to permit closure of the supply valve 12 without opening the exhaust valve 13. The supply valve 12 and the exhaust valve 13 may then be considered in lap position, wherein fluid under pressure supplied to the brake cylinder is trapped therein and the brakes are held applied with a force determined by the position of the operating handle 20 and the main shaft 18.

It will be seen from the foregoing, that the fluid pressure within the brake cylinder is determined by the degree of compression of the spring 9, which determines the pressure necessary in the brake cylinder to overcome the force thereof and permit movement of the supply valve to closed position.

The brake application zone of the brake valve lies between the positions marked "release doors closed" and "brakes applied doors open" as indicated in Fig. 2, the doors remaining closed until the brake valve is moved to the "brake application doors open" position, at which time the roller 19 is riding upon the upper face of the cam 22 and the stem 10 is depressed to the maximum extent permitted. At this time the spring 9 is compressed to such an extent that the maximum brake cylinder pressure is obtained before the supply valve 12 closes.

It is apparent from the foregoing that the brakes may be applied with any degree of force desired up to maximum without effecting movement of the brake valve handle to the "brakes applied door open" position. If, however, it is desired to bring the car to rest and to subsequently cause the car door to open, the brake valve handle 20 is moved to the "brakes applied door open" position indicated in Fig. 2.

It is an object of this invention to provide means for supplying fluid from the main reservoir to the brake cylinder at a relatively slow rate while the car door is in open position and to delay the opening of the door for a predetermined time after the brake valve is moved to the brake application door open position. Accordingly, the timing valve device 3 is provided and with the brake valve in the brake applied door open position, fluid under pressure is supplied from the main reservoir 4 to the cylinder 34 of the door engine 6 through pipe and passage 66, chamber 25, passage 73 in the rotary slide valve 26, indicated in Fig. 2, and passage and pipe 36. The pipe 36 is also connected to valve chamber 39 of the timing valve device and with the valve piston 38 in its normal position, as shown in Fig. 1, the chamber 39 is open to the atmosphere through port 75. The venting of fluid under pressure supplied to pipe 36 by way of the exhaust port 75 prevents the build up of fluid pressure in piston chamber 34 of the door engine, so that although the piston chamber 33 of the door engine is, with the parts in this position, open to the atmosphere by way of passage and pipe 35, port 81 in the rotary valve 26, indicated in Fig. 2, and exhaust passage and pipe 65, the door engine pistons will remain in the door closing position, so long as the pipe 36 is open to the atmosphere.

Fluid under pressure supplied through pipe 59 to the brake cylinder, also flows through the restricted passage 49 to the timing reservoir 48 and acts on the exposed seated area of the piston 38, when after a period of time, the pressure of fluid in the timing reservoir 48 has been increased sufficiently to overcome the opposing pressure of the spring 45, the piston 38 will be moved from its upper seat and the full area of the piston being then subjected to fluid pressure, the piston 38 is quickly moved to its lower seat.

Seating of the piston 38 upon the seat rib 44 closes communication between the atmosphere and the pipe 36, thereby permitting the pressure in the engine cylinder 34 to build up and move the piston 29 to the left and thereby open the car door. When the piston 38 is seated upon the seat rib 44, the slide valve 41 is moved to uncover the passage 40 and establish communication between the pipe 36 and the chamber 53 through passage 74, valve chamber 39, and passage 40. Fluid under pressure from the main reservoir is thus supplied to the chamber 53 and overcomes the lower brake cylinder pressure in the chamber 54, so that the valve piston 52 is moved into sealing engagement with the seat rib 57, thereby closing communication from the main reservoir to the brake cylinder through the passage 58. With the valve piston 52 sealing the passage 58, fluid is supplied to the brake cylinder from the main reservoir only through the choke passage 50 at a slow rate, the capacity of the passage 50 being such that sufficient fluid is supplied to the brake cylinder to compensate for possible leakage and to maintain the brakes applied. From the foregoing it is apparent, that so long as the door is open, fluid is supplied to the brake cylinder at a slow rate, thereby preventing the charging of the brake cylinder with fluid at a higher pressure than is necessary, thus conserving the fluid and shortening the time required to release the brakes.

In order to release the brakes, the brake valve handle 20 is moved to the release door closed position, as shown in Fig. 1, again establishing communication between the cylinder 34 of the door engine and the atmosphere through pipe and passage 36, cavity 64 in the rotary slide valve 26 and passage and pipe 65. Fluid under pressure is supplied from the main reservoir 4 to the door closing cylinder 33 through pipe and passage 66, slide valve chamber 25, port 67, and passage and pipe 35. The fluid supplied to the cylinder 33 causes the piston to move to the right and close the car door.

Fluid under pressure being released from the door open pipe 36 is also vented from the valve chamber 39 and from the piston chamber 53, and thus the brake cylinder pressure acting in the chamber 54 on the upper face of piston 52, causes downward movement of the piston 52 into sealing engagement with the seat rib 56 and the consequent opening of the passage 58 through which fluid is rapidly released from the brake cylinder, through pipe and passage 55, chamber 54, past the piston valve 52, passage 58, passage 51, pipe and passage 59, chamber 7 of the brake valve device past the open release valve 13, chamber 62, passage 63, cavity 64 in the rotary slide valve 26, and passage and pipe 65. Passage 76 having a ball check valve 77 therein, establishes communication between the chamber 54 and the passage 51 of the timing valve device, and permits immediate release of fluid from the brake cylinder by way of pipe and passage 55, chamber 54, passage 76, past the ball check valve 77 to the passage 51 and thence to the atmosphere in the manner just described, in the event of possible delay in the downward opening movement of the piston valve 52.

When the fluid pressure in the timing reservoir 48 is sufficiently reduced by venting to the atmosphere through the choke passage 49, the spring 45 moves the piston valve 38 upwardly into sealing engagement with the seat rib 43 and the slide valve 41 is returned to the release position shown in Fig. 1, wherein the chamber 53 beneath the valve piston 52 is connected to the atmosphere through passage 40, cavity 78 in the slide valve 41 and exhaust passage 79. With the parts of the equipment in the position just described and with the brake valve handle 20 in the release doors closed position, the doors of the car are closed and the brakes released. The equipment again is in readiness for an application of the brakes and opening movement of the doors in the manner described.

Summarizing, the brake equipment comprises a timing valve device that is used in conjunction with a brake valve of the automatically lapping type and a door engine for opening and closing the car doors, the timing valve being provided with a timing reservoir which controls the opening movement of the door and permits opening operation thereof a predetermined time after the brake valve operating handle is moved to brakes applied door open position. This device insures that the doors are maintained closed until sufficient time has lapsed in which the car may be brought to rest by the application of the brakes. Provision is made in the timing valve device to permit free flow of the fluid under pressure from the main reservoir to the brake cylinder until such time as the door is permitted to open. When the door is open, a cut-off valve associated with the timing valve device closes the free passage between the main reservoir and the brake cylinder, and permits fluid to flow to the brake cylinder thereafter through a restricted passage and at a slow rate just sufficient to supply possible leakage and maintain the brakes applied, thereby preventing waste of operating fluid and preventing overcharging of the brake cylinder and thereby reducing the time required to release the brakes.

The brakes are, therefore, held applied at a pressure less than that of the supply and when the brake valve operating handle is moved to the release door closed position, the fluid is rapidly released from the brake cylinder and fluid is supplied from the main reservoir to the door engine for closing the doors.

While I have disclosed but one embodiment of the fluid brake and car door operating equipment, it is obvious that many changes, additions and omissions may be made in the construction without departing from the spirit of the invention.

Having now described my invention, what I claim as new and desire to secure by Letters Patent, is:

1. In a car door and brake controlling apparatus, the combination with a fluid operated door engine for effecting opening and closing of a car door, and a fluid operated means for effecting operation of the brakes, of a means for controlling the rate of supply of fluid to the fluid operated means, and a fluid pressure operated means for controlling the operation of the door engine and the second said means.

2. In a car door and brake controlling apparatus, the combination with a fluid operated door engine for effecting opening and closing of a car door, a fluid operated means for effecting operation of the brakes and a normally controlled means for supplying fluid to the door engine and the said fluid operated means, of a valve means operated by pressure of fluid supplied to the said fluid operated means for controlling the operation of the door engine to effect opening of the door, and a second valve means controlled by the said valve means for controlling the rate of supply of fluid to the said fluel operated means.

3. In a car door and brake controlling apparatus, the combination with a fluid operated door engine for effecting opening and closing of a car door, and fluid operated means for effecting operation of the brakes, of a fluid operated valve device adapted to be moved to a position for permitting the door engine to operate to effect an opening of the car door when fluid is supplied to the means for effecting operation of the brakes, and a fluid operated valve device controlled by the first said valve device for controlling the rate of delivery of fluid to the means for effecting operation of the brakes.

4. In a car door and brake controlling apparatus, the combination with a fluid operated door engine for effecting opening and closing of a car door, and fluid operated means for effecting operation of the brakes, of a fluid operated valve device adapted to be moved to a position for permitting the door engine to operate to effect an opening of the car door a predetermined time after fluid is supplied to the means for effecting operation of the brakes, and a fluid operated valve device controlled by the first said valve device for controlling the rate of delivery of fluid to the means for effecting operation of the brakes.

5. In a car door and brake controlling apparatus, the combination with a door engine for controlling the opening and closing of a car door and fluid operated means for effecting an application of the brakes, of a valve device having a position in which the operation of the door engine to effect the opening of a car door is prevented, a timing reservoir adapted to be charged with fluid under pressure at a predetermined rate when the brakes are applied, said valve device being moved to a position for permitting the door engine to operate to effect the opening of a car door, upon a predetermined increase in pressure in said timing reservoir, and a second valve device controlled by the said valve device for controlling the rate of supply of fluid to the means for effecting an application of the brakes.

6. In a car door and brake controlling apparatus, the combination with a fluid operated door engine for effecting opening and closing of a car door, and fluid operated means for effecting an application of the brakes, of a valve device for controlling the operation of the door engine adapted when in one position to permit opening of the door and a fluid operated valve controlled by the said valve device for restricting the delivery of fluid to the said fluid operated means, when the valve device is in the said position.

7. In a car door and brake controlling apparatus, the combination with a fluid operated door engine for effecting opening and closing of a car door and fluid operated means for effecting an application of the brakes, of fluid operated valve means for effecting the supply of fluid to the fluid operated means at different rates, a valve device for controlling the pressure of the fluid supplied to the door engine, and for controlling the fluid operated valve means.

8. In a car door and brake controlling apparatus, the combination with a fluid operated door engine for effecting opening and closing of a car door, a brake cylinder for effecting application of the brakes, and a main reservoir for supplying fluid under pressure to the said door engine and brake cylinder, of a means for supplying fluid under pressure from the main reservoir to the door engine having a passage normally open to the atmosphere for preventing opening movement of the door so long as the passage is open, a means for supplying fluid under pressure to the brake cylinder through a free channel and a restricted channel, and a valve means operated, by fluid pressure supplied to the brake cylinder, to a position for closing the said normally open passage for effecting opening movement of the door, and a second valve means controlled by the said valve means for closing the free channel when the said valve is in position to effect closure of the said passage.

9. In a car door and brake controlling apparatus, the combination with a brake cylinder and a door engine operated by fluid under pressure for opening a car door, of a controlling valve device operative to supply fluid under pressure to the brake cylinder and to said door engine, a cut-off valve means normally permitting a rapid flow of fluid to the brake cylinder and operative to restrict the flow of fluid to the brake cylinder, and valve means normally venting fluid under pressure supplied to the door engine and operated upon a predetermined increase in the pressure of fluid supplied to the brake cylinder to cut off said venting and thereby permit the build up of fluid pressure on the door engine, said valve means also operating to effect the operation of said cut-off valve means to thereby restrict the rate of flow of fluid to the brake cylinder.

In testimony whereof I have hereunto set my hand, this 15th day of February, 1932.

JOSEPH C. McCUNE.